United States Patent
King

(10) Patent No.: US 9,988,063 B2
(45) Date of Patent: Jun. 5, 2018

(54) STABILIZING SYSTEM FOR USE WITH A REEL CART AND METHOD FOR FABRICATING THE SAME

(71) Applicant: King Enterprises, Mt. Vernon, IL (US)

(72) Inventor: Rodney Stuart King, Mt. Vernon, IL (US)

(73) Assignee: King Enterprises, Mt. Vernon, IL (US)

( * ) Notice: Subject to any disclaimer, the term of this patent is extended or adjusted under 35 U.S.C. 154(b) by 47 days.

(21) Appl. No.: 15/136,824

(22) Filed: Apr. 22, 2016

(65) Prior Publication Data

US 2017/0305452 A1   Oct. 26, 2017

(51) Int. Cl.
*B62B 5/00* (2006.01)
*B62B 1/12* (2006.01)

(52) U.S. Cl.
CPC .............. *B62B 5/0083* (2013.01); *B62B 1/12* (2013.01)

(58) Field of Classification Search
CPC ............ B62B 1/12; B62B 5/0083; B62B 5/00
USPC .................................................. 280/755, 47.2
See application file for complete search history.

(56) References Cited

U.S. PATENT DOCUMENTS

2016/0219205 A1* 7/2016 Kessler .................. G01M 3/00

* cited by examiner

*Primary Examiner* — Keith J Frisby
(74) *Attorney, Agent, or Firm* — Stinson Leonard Street LLP

(57) ABSTRACT

Embodiments of the disclosure enable a cart to be stabilized. A stabilizing mechanism includes a body having a first surface and a second surface that define an elongated nook configured to receive a first rod member. A coupling device is coupled to the body at a third surface such that the coupling device is substantially parallel to the first and/or second surfaces. The coupling device defines an elongated channel configured to receive a second rod member. A wheel assembly is coupled to the body at a fourth surface and includes a first end portion, a second end portion, and a plurality of wheels rotatable about an axis of rotation. A first wheel is coupled to the first end portion, and a second wheel is coupled to the second end portion. Aspects of the disclosure provide for utilizing the cart to move a load across various terrains efficiently and effectively.

9 Claims, 8 Drawing Sheets

STABILIZING SYSTEM FOR USE WITH A REEL CART AND METHOD FOR FABRICATING THE SAME

FIELD OF THE DISCLOSURE

The subject matter described herein relates generally to transport systems and, more specifically, to a stabilizing mechanism that is coupleable to a cart or trolley, such as a reel cart.

BACKGROUND

Known transport systems, such as carts or trolleys, include one or more wheels that rotate about an axle to allow a transport system to move a load from a first location to a second location. The wheels on at least some known transport systems, however, may be spaced such that the transport system is rendered relatively unstable, particularly when the transport system is used to move a load across a relatively uneven terrain and/or when the transport system has a relatively high center of gravity.

SUMMARY

Embodiments of the disclosure enable a cart to be stabilized using a stabilizing mechanism for moving a load between a plurality of locations. The stabilizing mechanism includes a body having a plurality of surfaces. The surface includes a first surface and a second surface that define an elongated nook configured to receive a first rod member. A coupling device is coupled to the body at a third surface such that the coupling device is substantially parallel to the first surface and/or the second surface. The coupling device defines an elongated channel configured to receive a second rod member. A wheel assembly is coupled to the body at a fourth surface. The wheel assembly includes a first end portion, a second end portion, and a plurality of wheels rotatable about an axis of rotation to facilitate moving the load between the plurality of locations. A first wheel is coupled to the first end portion, and a second wheel is coupled to the second end portion.

In another aspect, a method is provided for fabricating a stabilizing mechanism. The method includes coupling a coupling device to a lower step of a body such that the coupling device is substantially parallel to the lower step. The body includes the lower step and an upper step coupled to the lower step. The lower step and the upper step define an elongated nook configured to receive a first rod member. The coupling device defines an elongated channel configured to receive a second rod member. A wheel assembly is coupled to the upper step of the body. The wheel assembly includes a first end portion, a second end portion, and a plurality of wheels rotatable about an axis of rotation to facilitate moving a load between a plurality of locations. A first wheel is coupled to the first end portion, and a second wheel is coupled to the second end portion.

In yet another aspect, a transport system includes a cart and a stabilizing mechanism. The cart including a frame and a first plurality of wheels coupled to the frame. The frame includes a plurality of rod members extending between the first plurality of wheels. The stabilizing mechanism includes a body that includes a first step and a second step, a coupling device coupled to the first step, and a wheel assembly coupled to the second step. The first step and the second step define an elongated nook configured to receive a first rod member. The coupling device defines an elongated channel configured to receive a second rod member. The wheel assembly includes a plurality of end portions and a second plurality of wheels coupled to the end portions such that the second plurality of wheels are rotatable about an axis of rotation to facilitate moving a load between a plurality of locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

The subject matter described herein relates to a transport system including a stabilizing mechanism that may be used to move a load between a plurality of locations. Embodiments of the disclosure provide the ability to stabilize a trolley or cart using the stabilizing mechanism. The stabilizing mechanism includes a body, a coupling device coupled to the body, and a wheel assembly coupled to the body. The body has a plurality of surfaces including a first surface and a second surface that define an elongated nook configured to receive a first rod member of the cart. The coupling device defines an elongated channel configured to receive a second rod member of the cart. The wheel assembly includes a first end portion, a second end portion, and a plurality of wheels that are rotatable about an axis of rotation to facilitate moving the load between the plurality of locations. Aspects of the disclosure provide for moving the load across various terrains efficiently and effectively.

Figure 1:
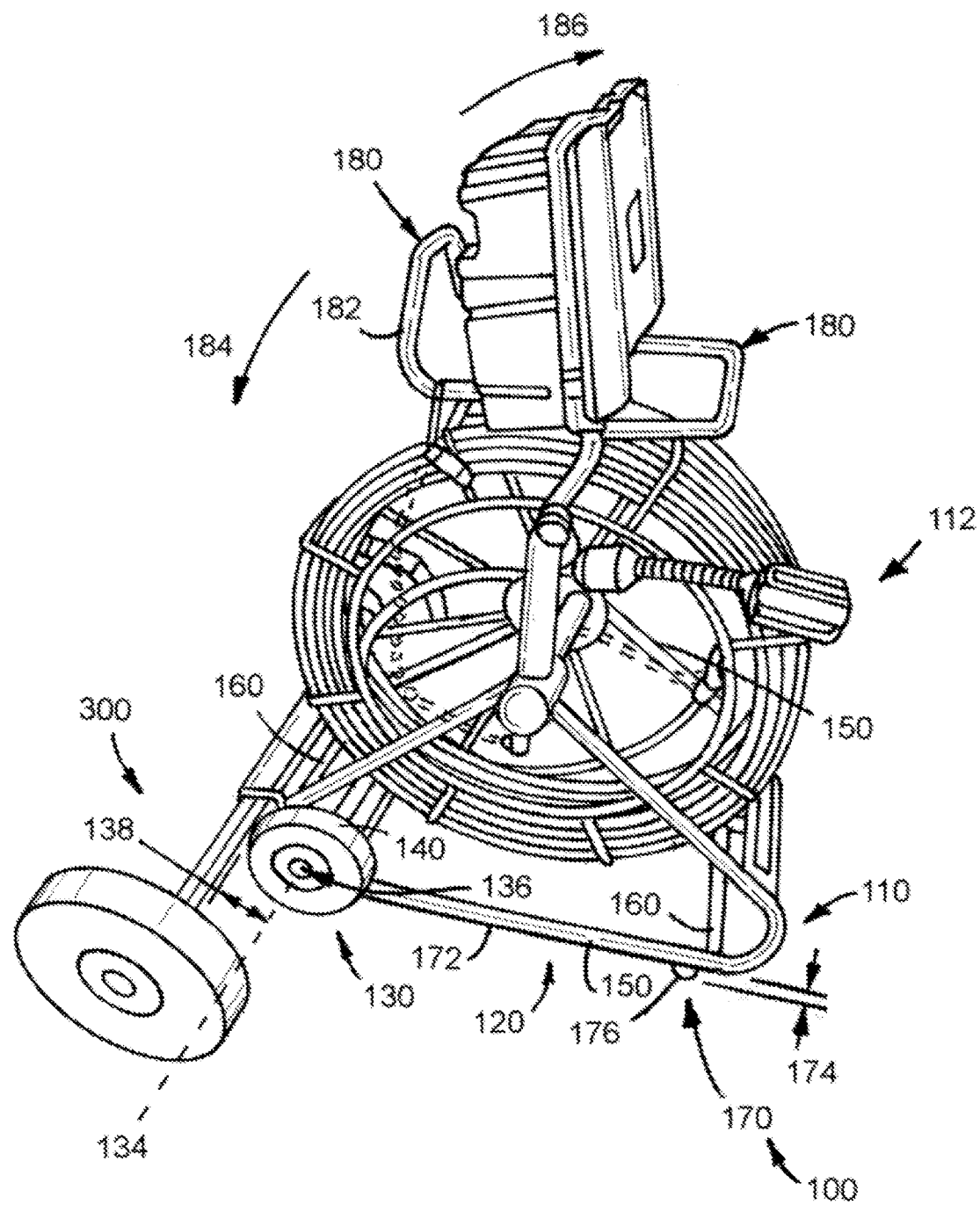
FIG. 1 is a perspective view of a transport system in a resting configuration.
Figure 2:
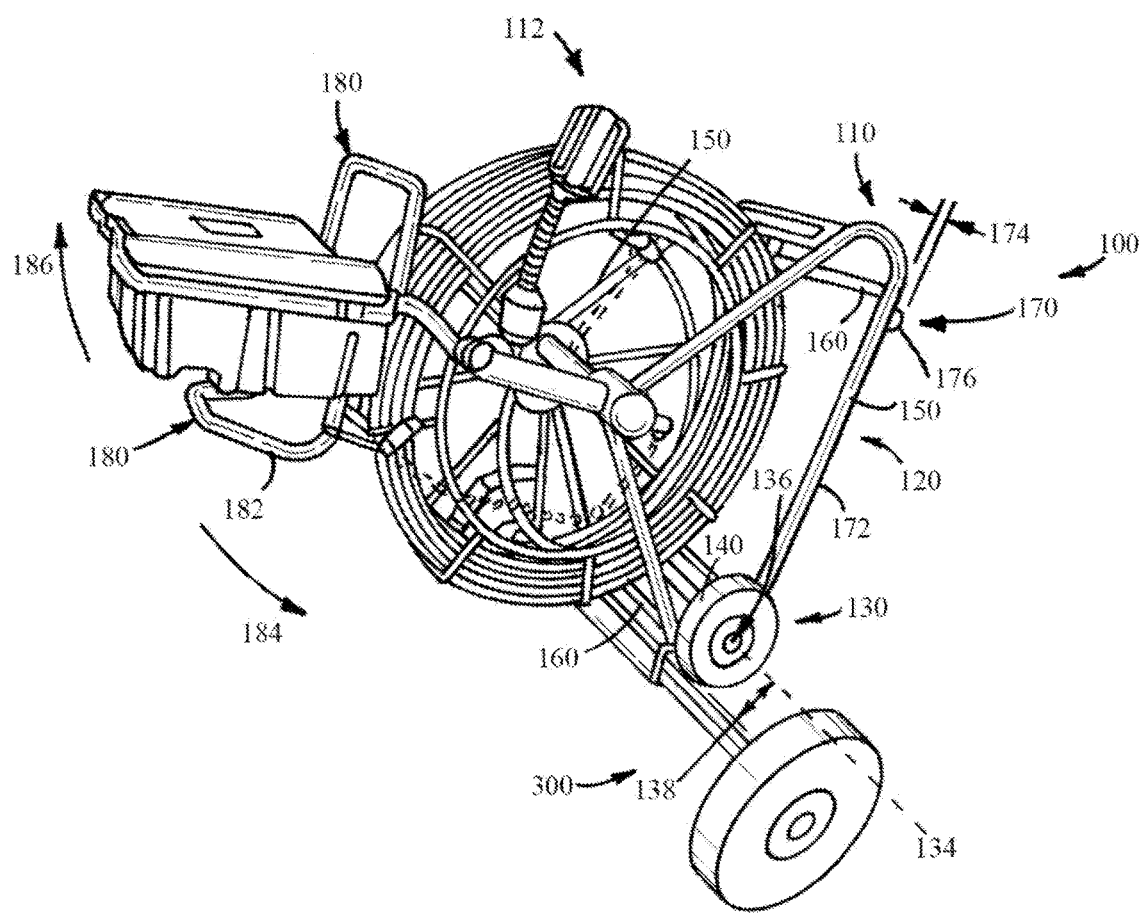
FIG. 2 is a perspective view of the transport system shown in FIG. 1 in a moving configuration.

FIG. 1 is a perspective view of a transport system 100 in a resting configuration. When in the resting configuration, the transport system 100 is in a substantially upright position. FIG. 2 is a perspective view of the transport system 100 in a moving configuration. When in the moving configuration, the transport system 100 is in a position other than the substantially upright position. Structurally, the transport system 100 remains the same or is substantially unchanged as it is adjusted between the resting configuration and the moving configuration. For example, the transport system 100 may be adjusted towards a moving configuration by tilting the transport system 100 from the substantially upright position such that a center of gravity is shifted relative to a fulcrum. Conversely, the transport system 100 may be adjusted towards the resting configuration by tilting the transport system 100 towards the substantially upright position.

The transport system 100 includes a cart 110 configured to move a load 112 between a plurality of locations. The cart 110 and load 112 may be, for example, a VERISIGHT PRO™ push camera system or a SOLO PRO 360™ push camera system (VERISIGHT PRO is a trademark of Envirosight, LLC, SOLO PRO 360 is a trademark of Mini-Cam Ltd.). Additionally or alternatively, the cart 110 and/or load 112 may be any apparatus used to move a load and/or any object that is moved between a plurality of locations.

In some embodiments, the cart 110 includes a frame 120 and a first plurality of wheels 130 that are rotatably coupled to the frame 120. The wheels 130 are spaced apart from each other to have a first width 132 (shown in FIG. 5) and rotatable about a first axis of rotation 134 defined by and extending through an axial center 136 of the wheels 130. The wheels 130 have a radius 138 that enables an outer surface 140 of the wheels 130 to be positioned on a surface below the transport system 100 (e.g., the ground) when the cart 110 is used as a standalone transport system 100 and in a moving configuration. In this manner, the wheels 130 may rotate as the cart 110 is utilized as a standalone transport system 100 to move the load 112.

The frame 120 includes a plurality of frame members 150 and a plurality of rod members 160 coupled to and extending laterally between the frame members 150. In some embodiments, the wheels 130 and/or the rod members 160 are positioned such that the rod members 160 generally extend laterally between the wheels 130. The frame 120 may include one or more feet 170 coupled to and extending downwardly from a lower surface of the frame members 150 and/or a lower surface 172 of the rod members 160. The feet 170 may have a height 174 that enables a lower surface 176 of the feet 170 to be positioned on a surface below the transport system 100 (e.g., the ground) when the cart 110 is in a resting configuration. In some embodiments, the wheels 130 and/or feet 170 are sized such that there is space between the outer surface 140 of the wheels 130 and the ground (e.g., the outer surface 140 of the wheels 130 are not positioned on the ground) when the cart 110 is in the resting configuration. Alternatively, the wheels 130 and/or feet 170 may be sized such that the outer surface 140 of the wheels 130 are positioned on the ground when the cart 110 is in the resting configuration.

The frame 120 may include one or more handles 180 that may be used to maneuver or control the transport system 100 and/or cart 110. For example, a first handle 182 may be moved in a first direction 184 to rotate or tilt the cart 110 about a first fulcrum (e.g., at or proximate to the axis of rotation 134) in a counterclockwise direction (as seen from a right side of the transport system 100 and/or cart 110 as shown in FIG. 1) and move the transport system 100 and/or cart 110 from the resting configuration to a moving configuration. Conversely, the first handle 182 may be moved in a second direction 186 to tilt the cart 110 about the first fulcrum in a clockwise direction (as seen from the right side of the transport system 100 and/or cart 110 as shown in FIG. 1) and move the transport system 100 and/or cart 110 from the moving configuration towards the resting configuration.

In some embodiments, the first handle 182 may be moved in the second direction 186 to tilt the cart 110 about a second fulcrum (e.g., an axis of rotation extending through or proximate to the lower surface 176 of the front feet 170) in the clockwise direction (as seen from the right side of the transport system 100 and/or cart 110 as shown in FIG. 1) and move the transport system 100 and/or cart 110 from the resting configuration to a coupling configuration. Conversely, the first handle 182 may be moved in the first direction 184 to tilt the cart 110 about the second fulcrum in a counterclockwise direction (as seen from the right side of the transport system 100 and/or cart 110 as shown in FIG. 1) and move the transport system 100 and/or cart 110 from a coupling configuration towards the resting configuration.

Figure 3:
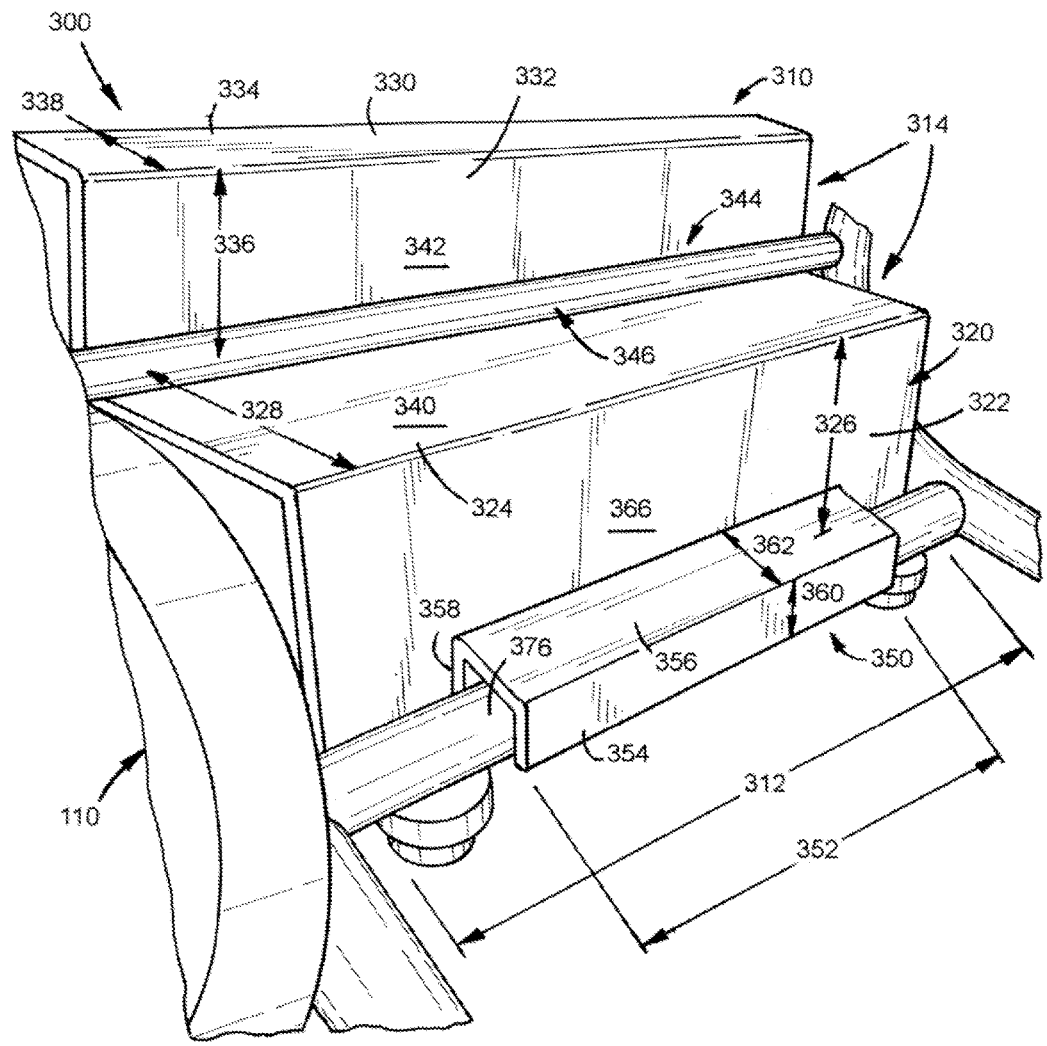
FIG. 3 is a detailed perspective view of the transport system shown in FIG. 1.
Figure 4:
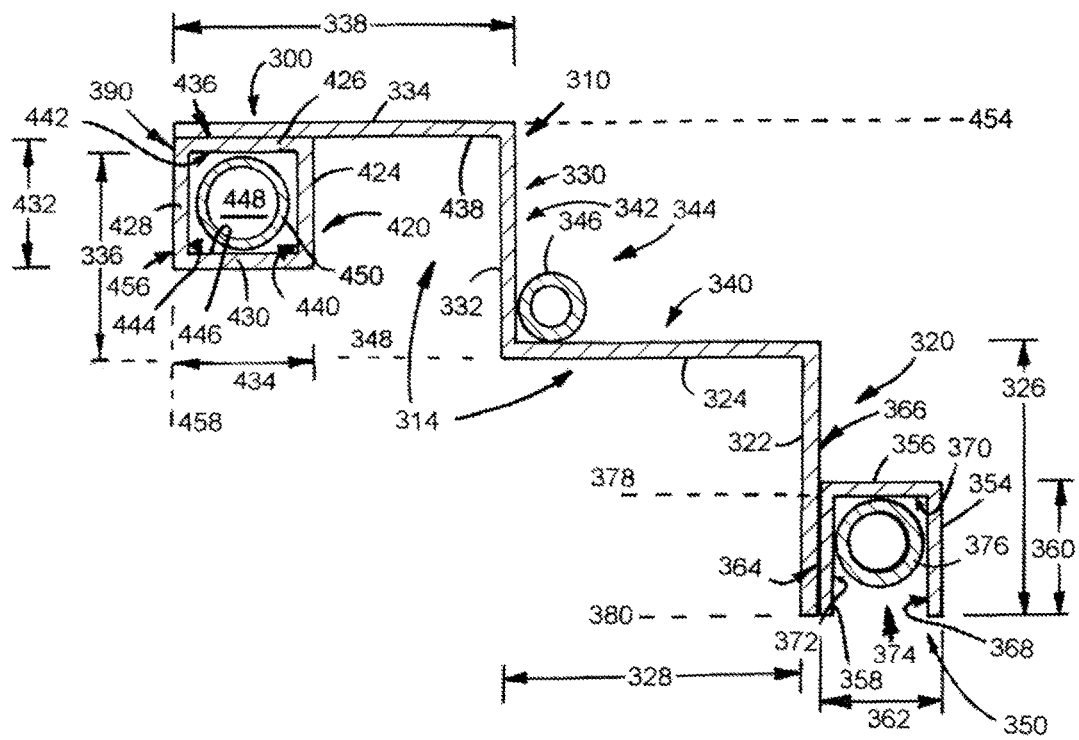
FIG. 4 is a detailed cross-sectional side view of the transport system shown in FIG. 1.
Figure 5:
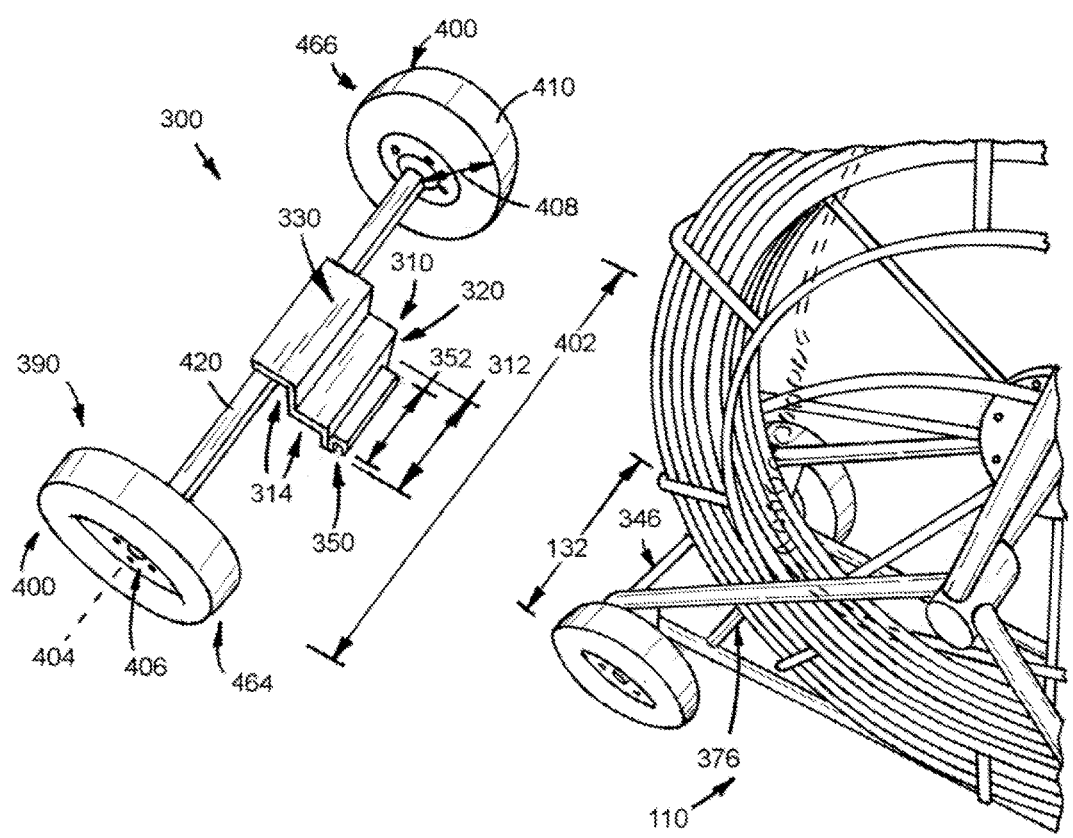
FIG. 5 is a detailed exploded view of the transport system shown in FIG. 1.
Figure 6:
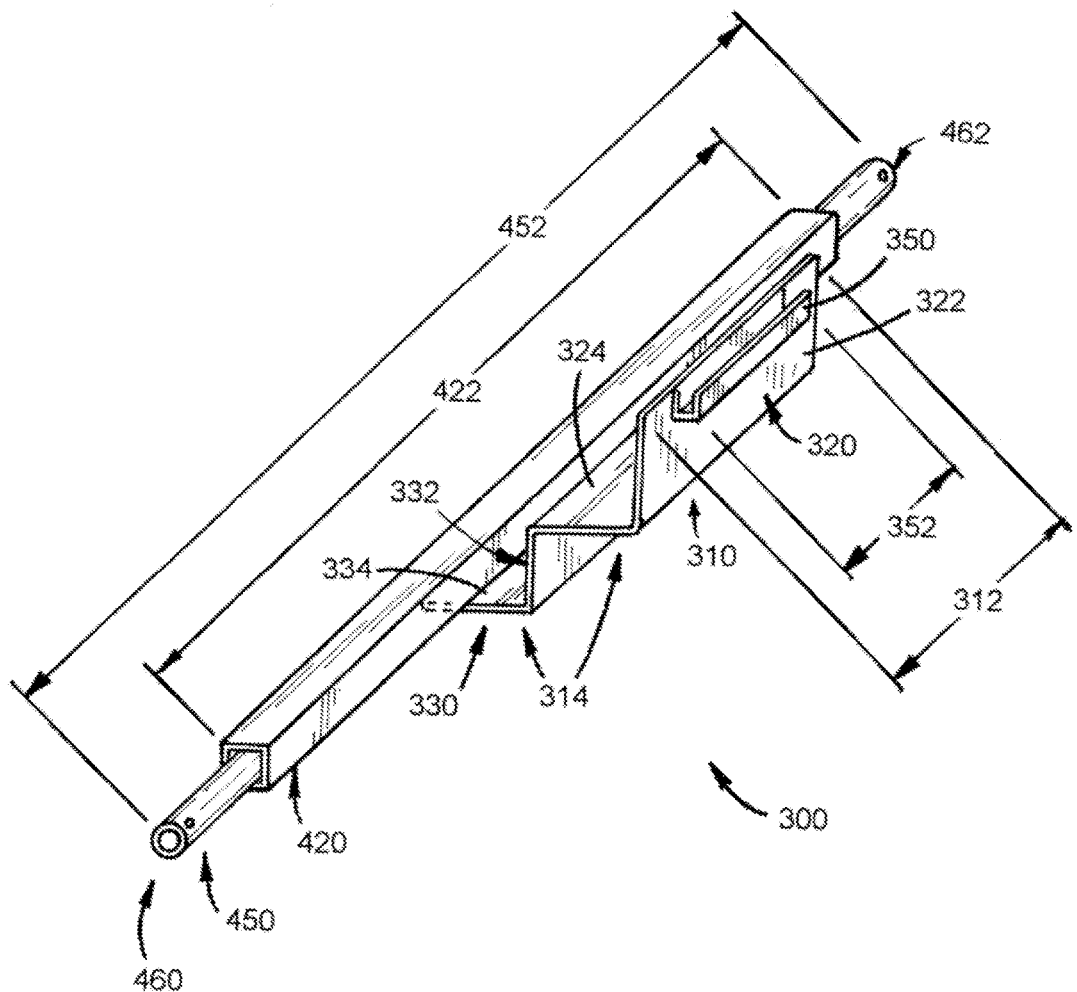
FIG. 6 is a bottom perspective view of a stabilizing mechanism that may be used in the transport system shown in FIG. 1.

In some embodiments, the transport system 100 includes a stabilizing mechanism 300 that is coupleable to the cart 110 to facilitate increasing a stability of the cart 110. FIG. 3 is a partial perspective view of the transport system 100 that shows the stabilizing mechanism 300 coupled to the cart 110 to facilitate increasing a stability of the cart 110. FIG. 4 is a partial cross-sectional view of the transport system 100 including the cart 110 and the stabilizing mechanism 300 coupled to the cart 110. FIG. 5 is a partial exploded view of the transport system 100 that shows the stabilizing mechanism 300 uncoupled from the cart 110. FIG. 6 is a bottom perspective view of a least a portion of the stabilizing mechanism 300.

The stabilizing mechanism 300 includes a body 310 that is coupleable to the cart 110. The body 310 is sized to fit between the wheels 130 of the cart 110. In some embodiments, the body 310 has a width 312 (shown in FIGS. 3, 5, and 6) between approximately 7.125 inches (in.) and approximately 10.125 in. For example, in one embodiment, the width 312 is approximately 8.625 in.

In some embodiments, the body 310 includes a plurality of steps 314. For example, the steps 314 include at least a first or lower step 320 having a first substantially vertical portion 322 (shown in FIGS. 3 and 4) and a substantially first substantially horizontal portion 324 (shown in FIGS. 3 and 4) coupled to and extending substantially rearwardly from an upper segment of the first vertical portion 322. The first vertical portion 322 may have a height 326 (shown in FIGS. 3 and 4) between approximately 2.125 in. and approximately 4.25 in., and/or the first horizontal portion 324 may have a depth 328 (shown in FIGS. 3 and 4) between approximately 1.5625 in. and approximately 3.6875 in. For example, in one embodiment, the height 326 is approximately 3.1875 in., and the depth 328 is approximately 2.625 in.

Additionally or alternatively, the steps 314 may include a second or upper step 330 having a second substantially vertical portion 332 (shown in FIGS. 3 and 4) and a second substantially horizontal portion 334 (shown in FIGS. 3 and 4) coupled to and extending substantially rearwardly from an upper segment of the second vertical portion 332. The second vertical portion 332 may have a height 336 (shown in FIGS. 3 and 4) between approximately 1.5625 in. and approximately 3.1875 in., and/or the first horizontal portion 324 may have a depth 338 (shown in FIGS. 3 and 4) between approximately 1.4375 in. and approximately 3.5625 in. For example, in one embodiment, the height 336 is approximately 2.375 in., and the depth 338 is approximately 2.5 in.

In some embodiments, the upper step 330 is coupled to the lower step 320 such that the second vertical portion 332 is coupled to and extends substantially upwardly from the first horizontal portion 324. For example, the first horizontal portion 324 may have an upper surface 340 (e.g., a first surface of the body 310) (shown in FIGS. 3 and 4), and the second vertical portion 332 may have an anterior surface 342 (e.g., a second surface of the body 310) (shown in FIGS. 3 and 4) that define an elongated nook 344 (shown in FIGS.

3 and 4) configured to receive a first rod member 346 (shown in FIGS. 3, 4, and 5) of the plurality of rod members 160. The upper surface 340 extends substantially at a first step elevation 348 (shown in FIG. 4) and is oriented such that the elongated nook 344 is configured to receive the first rod member 346 at or above the first step elevation 348. In this manner, the upper surface 340 and/or the anterior surface 342 engage the first rod member 346 when the stabilizing mechanism 300 is coupled to the cart 110.

The stabilizing mechanism 300 includes a coupling device 350 coupled to the body 310 and coupleable to the cart 110. The coupling device 350 is sized to fit between the wheels 130 of the cart 110. In some embodiments, the coupling device 350 has a width 352 (shown in FIGS. 3, 5, and 6) between approximately 4.25 in. and approximately 7.25 in. For example, in one embodiment, the width 352 is approximately 5.75 in.

In some embodiments, the coupling device 350 is an upside-down U-shaped bracket including a front substantially vertical portion 354 (shown in FIGS. 3 and 4), a substantially horizontal portion 356 (shown in FIGS. 3 and 4) coupled to and extending rearwardly from an upper segment of the front vertical portion 354, and a rear substantially vertical portion 358 (shown in FIGS. 3 and 4) coupled to and extending downwardly from a rear segment of the horizontal portion 356. The front vertical portion 354 and/or the rear vertical portion 358 may have a height 360 (shown in FIGS. 3 and 4) between approximately 0.375 in. and approximately 1.125 in., and/or the horizontal portion 356 may have a depth 362 (shown in FIGS. 3 and 4) between approximately 0.5 in. and approximately 1.5 in. For example, in one embodiment, the height 360 is approximately 0.875 in., and the depth 362 is approximately 1.0 in.

A posterior surface 364 (shown in FIG. 4) of the rear vertical portion 358 may be coupled to an anterior surface 366 (shown in FIGS. 3 and 4) of the first vertical portion 322 (e.g., a third surface of the body 310) such that the coupling device 350 is substantially parallel to the upper surface 340 and/or to the anterior surface 342. Alternatively, the rear segment of the horizontal portion 356 may be coupled to the anterior surface 366, where the coupling device 350 is an upside-down L-shaped bracket including the front vertical portion 354, and the horizontal portion 356 coupled to and extending rearwardly from the upper segment of the front vertical portion 354.

A posterior surface 368 (shown in FIG. 4) of the front vertical portion 354, a lower surface 370 (shown in FIG. 4) of the horizontal portion 356, and/or an anterior surface 372 (shown in FIG. 4) of the rear vertical portion 358 define an elongated channel 374 (shown in FIG. 4) configured to receive a second rod member 376 (shown in FIGS. 3, 4, and 5) of the plurality of rod members 160. The lower surface 370 is a stop surface extending substantially at a stop elevation 378 (shown in FIG. 4) and is oriented such that the elongated channel 374 is configured to receive the second rod member 376 at or below the stop elevation 378. In this manner, the posterior surface 368, the lower surface 370, and/or the anterior surface 372 engage the second rod member 376 when the stabilizing mechanism 300 is coupled to the cart 110. In some embodiments, the coupling device 350 is sized and/or positioned such that the stop elevation 378 is lower than the first step elevation 348, and/or a lower segment of the front vertical portion 354, a lower segment of the rear vertical portion 358, and/or a lower segment of the first vertical portion 322 is substantially at a lower elevation 380 (shown in FIG. 4).

The stabilizing mechanism 300 includes a wheel assembly 390 (shown in FIGS. 4 and 5) coupled to the body 310. The wheel assembly 390 includes a second plurality of wheels 400 (shown in FIG. 5) that are spaced apart from each other to have a second width 402 (shown in FIG. 5) wider than the first width 132 and that are rotatable about a second axis of rotation 404 (shown in FIG. 5) defined by and extending through an axial center 406 (shown in FIG. 5) of the wheels 400. The wheels 400 have a radius 408 (shown in FIG. 5) that enables an outer surface 410 (shown in FIG. 5) of the wheels 400 to be positioned on a surface below the transport system 100 (e.g., the ground) when the transport system 100 is in a moving configuration. In this manner, the wheels 400 may rotate as the stabilizing mechanism 300 is coupled to the cart 110 for moving the load 112. The wheels 400 and/or feet 170 may be sized such that the outer surface 410 of the wheels 400 are positioned on the ground when the transport system 100 is in the resting configuration. Alternatively, the wheels 400 and/or feet 170 may be sized such that there is space between the outer surface 410 of the wheels 400 and the ground (e.g., the outer surface 410 of the wheels 400 are not positioned on the ground) when the transport system 100 is in the resting configuration.

In some embodiments, the wheel assembly 390 includes an axle housing 420 (shown in FIGS. 4, 5, and 6). The axle housing 420 is sized to fit between the wheels 400 of the wheel assembly 390. In some embodiments, the axle housing 420 has a width 422 (shown in FIG. 6) between approximately 14.5 in. and approximately 38.5 in. For example, in one embodiment, the width 422 is approximately 26.5 in.

In some embodiments, the axle housing 420 is a quadrilateral (e.g., square) tubing including a front substantially vertical portion 424 (shown in FIG. 4), an upper substantially horizontal portion 426 (shown in FIG. 4) coupled to and extending rearwardly from an upper segment of the front vertical portion 424, a rear substantially vertical portion 428 (shown in FIG. 4) coupled to and extending downwardly from a rear segment of the upper horizontal portion 426, and a lower substantially horizontal portion 430 (shown in FIG. 4) coupled to and extending forwardly from a lower segment of the rear vertical portion 428 such that a front segment of the lower horizontal portion 430 is coupled to a lower segment of the front vertical portion 424. The front vertical portion 424 and/or the rear vertical portion 428 may have a height 432 (shown in FIG. 4) between approximately 0.5 in. and approximately 1.5 in., and/or the upper horizontal portion 426 and/or the lower horizontal portion 430 may have a depth 434 (shown in FIG. 4) between approximately 0.5 in. and approximately 1.5 in. For example, in one embodiment, the height 432 is approximately 1.0 in., and the depth 434 is approximately 1.0 in.

An upper surface 436 (shown in FIG. 4) of the upper horizontal portion 426 may be coupled to a lower surface 438 (shown in FIG. 4) of the second horizontal portion 426 (e.g., a fourth surface of the body 310) such that the axle housing 420 is substantially parallel to the upper surface 340 and/or to the anterior surface 342. Alternatively, the upper segment of the front vertical portion 424 and/or the rear vertical portion 428 may be coupled to the lower surface 438, where the axle housing 420 is a U-shaped bracket including the rear vertical portion 428, the lower horizontal portion 430 coupled to and extending forwardly from a lower segment of the rear vertical portion 428, and the front vertical portion 424 coupled to and extending upwardly from a front segment of the lower horizontal portion 430.

A posterior surface 440 (shown in FIG. 4) of the front vertical portion 424, a lower surface 442 (shown in FIG. 4) of the upper horizontal portion 426, an anterior surface 444 (shown in FIG. 4) of the rear vertical portion 428, and/or an upper surface 446 (shown in FIG. 4) of the lower horizontal portion 430 define an elongated cavity 448 (shown in FIG. 4) configured to house an axle member 450 (shown in FIGS. 4 and 6) extending through the elongated cavity 448 such that the axle member 450 is rotatable within the elongated cavity 448. The axle member 450 is sized to fit between the wheels 400 of the wheel assembly 390 and enable the wheels 400 to be spaced apart from each other at the second width 402. In some embodiments, the axle member 450 has a width 452 (shown in FIG. 6) that is greater than the width 422 of the axle housing 420 and between approximately 20.0 in. and approximately 44.0 in. For example, in one embodiment, the width 452 is approximately 32.0 in.

The lower surface 442 extends substantially at a second step elevation 454 (shown in FIG. 4) higher than the first step elevation 348 and is oriented such that the second axis of rotation 404 is at or below the second step elevation 454. In some embodiments, the axle housing 420 is sized and/or positioned such that a posterior surface 456 (shown in FIG. 4) of the rear vertical portion 428 extends substantially at a rear depth 458 (shown in FIG. 4). The axle member 450 includes a first end portion 460 (shown in FIG. 6) and a second end portion 462 (shown in FIG. 6). In some embodiments, the first end portion 460 is coupled to a first wheel 464 (shown in FIG. 5) of the second plurality of wheels 400 and the second end portion 462 is coupled to a second wheel 466 (shown in FIG. 5) of the second plurality of wheels 400 such that the first wheel 464 and the second wheel 466 are spaced apart from each other at the second width 402.

Figure 7:
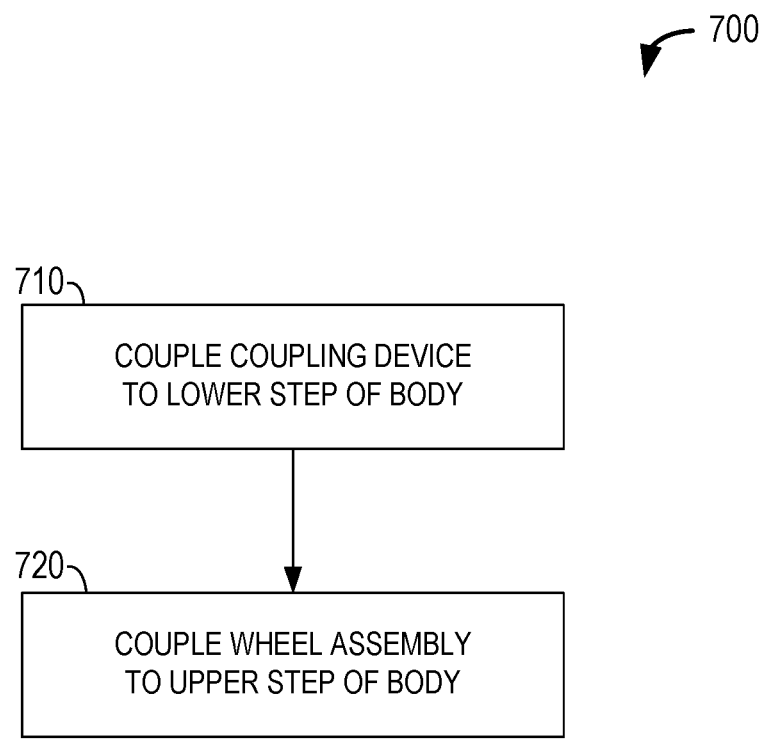
FIG. 7 is a flowchart of an example method that may be used for fabricating the stabilizing mechanism shown in FIG. 6.

FIG. 7 is a flowchart of an example method 700 that may be used for fabricating the stabilizing mechanism 300. The stabilizing mechanism 300 includes a body 310, a coupling device 350, and a wheel assembly 390. The body 310 is formed to include at least a lower step 320 and an upper step 330. The body 310 may include, for example, a first surface (e.g., an upper surface 340 of the lower step 320) and a second surface (e.g., an anterior surface 342 of the upper step 330) that define an elongated nook 344 configured to receive a first rod member 346. For example, the body 310 may be fabricated from an aluminum plate that is approximately 0.1875 in. thick. Alternatively, the body 310 may be fabricated from any material having any thickness that enables the body 310 to function as described herein.

The coupling device 350 is formed to include at least a front vertical portion 354 and a horizontal portion 356 that define an elongated channel 374 configured to receive a second rod member 376. For example, the coupling device 350 may be fabricated from an aluminum U-channel stock. Alternatively, the coupling device 350 may be fabricated from any material that enables the coupling device 350 to function as described herein.

The wheel assembly 390 is formed to include a first end portion 460 coupled to a first wheel 464 and a second end portion 462 coupled to a second wheel 466. In some embodiments, the wheel assembly 390 includes an axle housing 420 that defines an elongated cavity 448 and an axle member 450 that extends through the elongated cavity 448 such that the axle member 450 is rotatable within the elongated cavity 448. For example, the axle housing 420 may be fabricated from an aluminum tubing stock and have a thickness of approximately 0.125 in., and the axle member 450 may be fabricated from an aluminum rod stock having a diameter of approximately 0.625 in. Alternatively, the axle housing 420 and/or axle member 450 may be fabricated from any material and have any thickness that enables the wheel assembly 390 to function as described herein.

The coupling device 350 is coupled at 710 to the lower step 320 of the body 310. For example, a posterior surface 364 of the coupling device 350 may be coupled to an anterior surface 366 of the lower step 320. In some embodiments, the coupling device 350 is welded to the lower step 320. Alternatively, the coupling device 350 may be coupled to the lower step 320 using any coupling process or device that enables the stabilizing mechanism 300 to function as described herein. The coupling device 350 may be coupled to the lower step 320 such that the coupling device 350 is substantially parallel to the lower step 320. Additionally or alternatively, the body 310 may be positioned such that an upper surface 340 of the lower step 320 extends substantially at a first step elevation 348, and the coupling device 350 is positioned such that a stop surface (e.g., a lower surface 370 of a horizontal portion 356) of the coupling device extends substantially at a stop elevation 378 lower than the first step elevation 348.

The wheel assembly 390 is coupled at 720 to the upper step 330 of the body 310. For example, an upper surface 436 of the wheel assembly 390 may be coupled to a lower surface 438 of the upper step 330. In some embodiments, the wheel assembly 390 is welded to the upper step 330. Alternatively, the wheel assembly 390 may be coupled to the upper step 330 using any coupling process or device that enables the stabilizing mechanism 300 to function as described herein. The wheel assembly 390 may be coupled to the upper step 330 such that the wheel assembly 390 is substantially parallel to the upper step 330. Additionally or alternatively, the body 310 may be positioned such that the lower surface 436 of the upper step 330 extends substantially at a second step elevation 454, and the wheel assembly 390 is positioned such that the second axis of rotation 404 is below the second step elevation 454.

Figure 8:
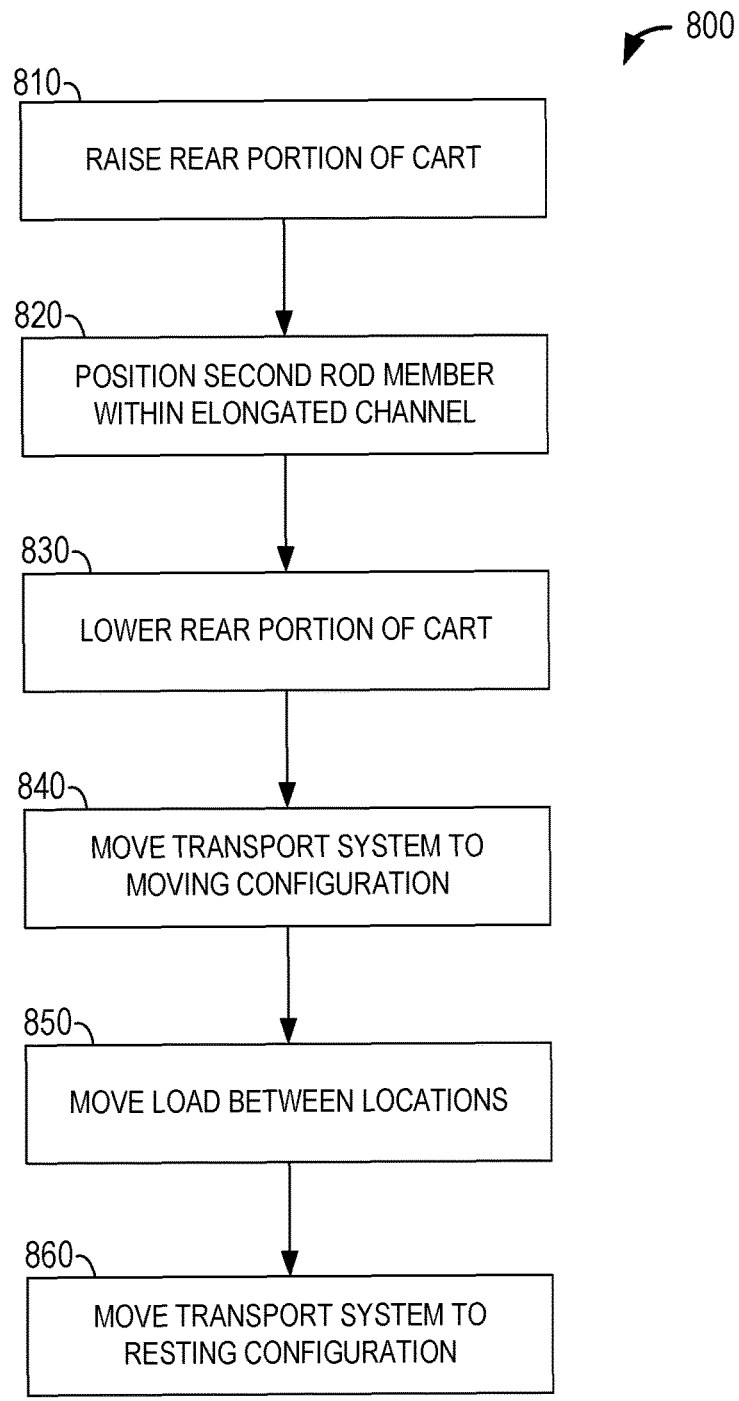
FIG. 8 is a flowchart of an example method that may be used for utilizing the stabilizing mechanism shown in FIG. 6.

FIG. 8 is a flowchart of an example method 800 that may be used for utilizing the stabilizing mechanism 300. A first handle 182 is moved in a second direction 186 to raise at 810 a rear portion of a cart 110 such that the cart 110 is rotated or tilted about a second fulcrum (e.g., an axis of rotation extending through or proximate to the lower surface 176 of the front feet 170) in a clockwise direction (as seen from the right side of the transport system 100 and/or cart 110 as shown in FIG. 1) and move the transport system 100 and/or cart 110 from the resting configuration to a coupling configuration. While in the coupling configuration, a stabilizing mechanism 300 is positioned such that a second rod member 376 is positioned at 820 within an elongated channel 374 defined by a coupling device 350.

Upon positioning the second rod member 376 within the elongated channel 374, the first handle 182 is moved in a first direction 184 to lower at 830 the rear portion of the cart 110 such that the cart 110 is tilted about the second fulcrum in a counterclockwise direction (as seen from the right side of the transport system 100 and/or cart 110 as shown in FIG. 1) and move the transport system 100 and/or cart 110 from the coupling configuration to the resting configuration. Upon being positioned in the resting configuration, the first rod member 346 engages an upper surface 340 of a lower step 320 and/or an anterior surface 342 of an upper step 330 such that the first rod member 346 is positioned within the elongated nook 344.

Upon coupling the stabilizing mechanism 300 to the cart 110, the first handle 182 is moved in the first direction 184 to rotate or tilt the cart 110 about a third fulcrum (e.g., at or proximate to an axis of rotation 404) in a counterclockwise direction (as seen from a right side of the transport system 100 and/or cart 110 as shown in FIG. 1) and move at 840 the transport system 100 from the resting configuration to a moving configuration. While in the moving configuration, the first handle 182 may be moved in a forward direction or a rearward direction (e.g., a direction substantially perpendicular to the axis or rotation 404) such that a second plurality of wheels 400 may rotate as the stabilizing mechanism 300 is utilized to move at 850 a load 112 between a plurality of locations.

When the transport system 100 is moved in the forward direction or the rearward direction, a first rate of rotation associated with a first wheel 464 of the second plurality of wheels 400 is the same or substantially similar to a second rate of rotation associated with a second wheel 466 of the second plurality of wheels 400. In some embodiments, the wheels 400 are independently rotatable such that the transport system 100 is configured to pivot (e.g., rotate about a vertical axis of rotation) when a first rate of rotation associated with a first wheel 464 is different from a second rate of rotation associated with a second wheel 466. In this manner, the transport system 100 may be pivoted or turned in a first direction when the first rate of rotation is greater than the second rate of rotation, and pivoted or turned in a second direction (e.g., to turn the second direction) when the first rate of rotation is less than the second rate of rotation.

Upon reaching a destination, the first handle 182 is moved in the second direction 186 to tilt the cart 110 about the third fulcrum in the clockwise direction (as seen from a right side of the transport system 100 and/or cart 110 as shown in FIG. 1) and move at 860 the transport system 100 from the moving configuration to the resting configuration.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

As used herein, directional terms such as "forward," "rearward," "anterior," "posterior," "above," "below," "higher," "lower," "vertical," "horizontal," "lateral," as well as any other similar directional terms are used for purposes of clarity in conjunction with the drawings. It will be appreciated that the transport system 100 may be positioned in any orientation that enables the transport system 100 to function as described herein.

As used herein, terms of degree such as "substantially," "about," and "approximately" may include a quantitative representation and any reasonable deviation from the quantitative representation that enables the embodiments described herein to function as described herein. For example, "substantially horizontal" means positioned at an angle of about negative 20 degrees to about positive 20 degrees, preferably at an angle of about negative 10 degrees to about positive 10 degrees, and more preferably at an angle of about negative 5 degrees to about positive 5 degrees. For another example, "substantially vertical" means positioned at an angle of about 70 degrees to about 110 degrees, preferably at an angle of about 80 degrees to about 100 degrees, and more preferably at an angle of about 85 degrees to an angle of about 95 degrees.

Numerical data may be expressed or presented herein in a range format. A range format is used herein for convenience and brevity and thus should be interpreted flexibly to include the numerical values used as the limits of the range, but also to include numerical values encompassed within that range as if each numerical value and sub-range is explicitly recited. For example, a numerical range of "about 1 to about 3" should be interpreted to include values of about 1 to about 3 and any sub-range included therein, including values of about 1 to about 2, values of about 2 to about 3, and individual values such as about 1, about 2, and about 3.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A stabilizing mechanism for moving a load between a plurality of locations, the stabilizing mechanism comprising:
    a body having a plurality of surfaces, the plurality of surfaces comprising a first surface and a second surface that define an elongated nook configured to receive a first rod member;
    a coupling device coupled to the body at a third surface of the plurality of surfaces such that the coupling device is substantially parallel to one or more of the first surface or the second surface, the coupling device defining an elongated channel configured to receive a second rod member; and
    a wheel assembly coupled to the body at a fourth surface of the plurality of surfaces, the wheel assembly comprising a first end portion, a second end portion, and a plurality of wheels rotatable about an axis of rotation to facilitate moving the load between the plurality of locations, the plurality of wheels comprising a first wheel coupled to the first end portion and a second wheel coupled to the second end portion.

2. The stabilizing mechanism of claim 1, wherein the body comprises a plurality of steps, the plurality of steps comprising a first step and a second step, the first surface being an upper surface of the first step, the second surface being an anterior surface of the second step.

3. The stabilizing mechanism of claim 1, wherein the first surface extends substantially at a step elevation and is oriented such that the elongated nook is configured to receive the first rod member at or above the step elevation.

4. The stabilizing mechanism of claim 1, wherein the coupling device comprises a substantially vertical portion and a substantially horizontal portion that define the elongated channel.

5. The stabilizing mechanism of claim 1, wherein the body comprises a plurality of steps, the plurality of steps comprising a lower step, the third surface being an anterior surface of the lower step.

6. The stabilizing mechanism of claim 1, wherein the coupling device has a stop surface extending substantially at a stop elevation and is oriented such that the elongated channel is configured to receive the second rod member at or below the stop elevation.

7. The stabilizing mechanism of claim 1, wherein the body comprises a plurality of steps, the plurality of steps comprising an upper step, the fourth surface being a lower surface of the upper step.

8. The stabilizing mechanism of claim 1, wherein the fourth surface extends substantially at a step elevation and is oriented such that the axis of rotation is at or below the step elevation.

9. The stabilizing mechanism of claim 1, wherein the wheel assembly comprises an axle housing that defines an elongated cavity and an axle member that extends through the elongated cavity such that the axle member is rotatable within the elongated cavity, the axle member comprising the first end portion and the second end portion.

* * * * *